UNITED STATES PATENT OFFICE.

HENRY W. MERRITT, OF SOMERVILLE, ASSIGNOR TO WILLIAM H. IRELAND, OF BOSTON, MASSACHUSETTS.

COMPOUND FOR COVERING ELECTRIC WIRES.

SPECIFICATION forming part of Letters Patent No. 366,336, dated July 12, 1887.

Application filed February 5, 1887. Serial No. 226,733. (No specimens.)

*To all whom it may concern:*

Be it known that I, HENRY W. MERRITT, of Somerville, in the county of Middlesex and State of Massachusetts, have invented a new and useful Improvement in Compounds for Covering Electric Wires, of which the following is a specification.

The object of my invention is to produce a substance that shall be quite hard and yet flexible and able to resist the action of heat or extreme cold, also to be a non-conductor of electricity and capable of resisting to a large extent the effects of electric induction.

This invention I put in practice by making a compound substantially as per following formula: First, one pound of quicklime is slaked by one quart of water, and while still hot a pound of fir-balsam, Burgundy pitch, or a pitch compound is mixed with it. This pitch compound may be heated before mixing, or in case the lime is hot enough from its own chemical reaction in its union with water it may be put in without previous heating. After this mixture is well prepared, four pounds of ground asbestus or its equivalent of neutral earths are to be thoroughly incorporated. Then one ounce of white sugar, sorghum, or glucose is added, and to coagulate the mass a small quantity—for instance, three grains—of oxalic acid dissolved in hot water is added.

This compound is to be used for covering electric wires, forming a coating which shall protect the wire from the action of the weather, insulate it, and also protect it from electric induction; or it may be used for other purposes to which it may be adapted.

Having thus described my invention, what I claim is—

The compound above described, consisting of quicklime, fir-balsam, asbestus, sugar, oxalic acid, and water, compounded substantially as described, and for the purpose set forth.

HENRY W. MERRITT.

Witnesses:
WILLIAM EDSON,
E. A. BULLARD.